United States Patent [19]
Freeman

[11] Patent Number: 4,794,449
[45] Date of Patent: Dec. 27, 1988

[54] ELECTRON MULTIPLIER FLAT CRT DISPLAY APPARATUS PROVIDING SUCCESSIVE COLOR SCANNING LINES FOR EACH SCANNING LINE OF A RECEIVED COLOR VIDEO SIGNAL

[75] Inventor: Kenneth G. Freeman, Reigate, England

[73] Assignee: U.S. Philips Corporation, New York, N.Y.

[21] Appl. No.: 914,047

[22] Filed: Oct. 1, 1986

[30] Foreign Application Priority Data

Oct. 4, 1985 [GB] United Kingdom ............... 8524547

[51] Int. Cl.$^4$ .................... H04N 9/26; H04N 9/22
[52] U.S. Cl. ...................... 358/71; 358/66; 313/103 CM
[58] Field of Search ............ 358/71, 66, 64, 11; 313/103 CM, 104

[56] References Cited

U.S. PATENT DOCUMENTS

| | | | |
|---|---|---|---|
| 3,372,232 | 3/1968 | Shimada | 358/71 |
| 3,436,469 | 4/1969 | Nakazawa | 358/71 |
| 3,452,242 | 6/1969 | Miyaoka | 358/71 |
| 3,539,713 | 11/1970 | Andrade et al. | 358/71 |
| 4,158,210 | 6/1979 | Watanabe et al. | 358/56 |
| 4,301,468 | 11/1981 | Alvarez | 358/64 |
| 4,451,852 | 5/1984 | Masuda et al. | 358/230 |
| 4,490,739 | 12/1984 | Himuro et al. | 358/66 |
| 4,560,898 | 12/1985 | Knapp et al. | 313/400 |

FOREIGN PATENT DOCUMENTS

| | | |
|---|---|---|
| 1434053 | 4/1976 | United Kingdom . |
| 2023332 | 12/1979 | United Kingdom . |
| 2094117 | 9/1982 | United Kingdom . |
| 2124017 | 2/1984 | United Kingdom . |

Primary Examiner—James J. Groody
Assistant Examiner—Robert M. Bauer
Attorney, Agent, or Firm—Robert J. Kraus

[57] ABSTRACT

Color display apparatus including a color display tube in which a single electron beam is scanned in television raster fashion across the input surface of an electron multiplier (16) adjacent a screen (14) comprising a repeating pattern of three different color phosphors, and in which deflection of the beam emanating from the multiplier onto respective ones of the three phosphors is controlled by color selection electrodes (38, 40) adjacent output apertures of the multiplier. The apparatus includes driving circuitry using line stores (64) which performs line scanning at three times the standard rate and controls switching of the color selection electrodes so as to display in turn the three color components of each standard picture line during the standard line period. Vertical scanning may be effected continuously or in stepped fashion.

10 Claims, 3 Drawing Sheets

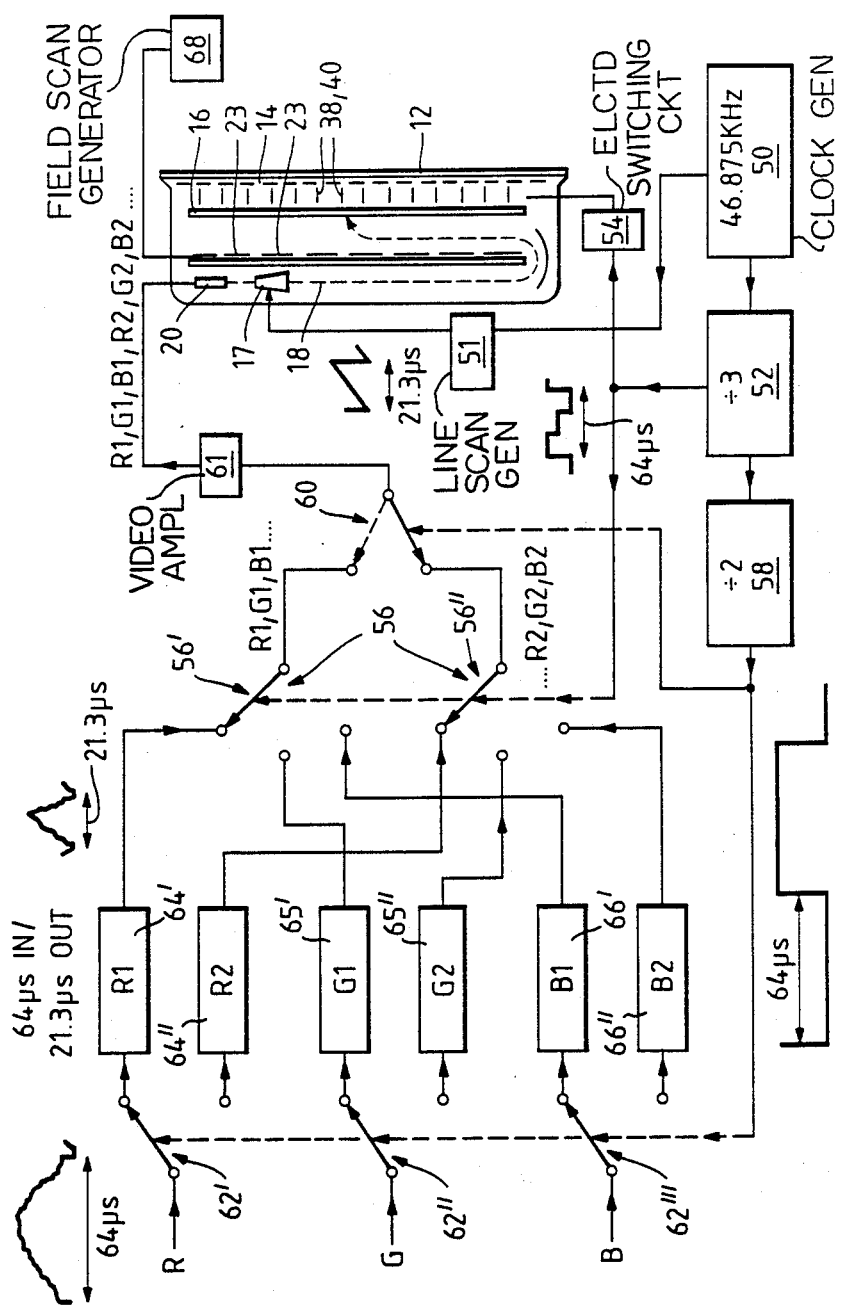

ELECTRON MULTIPLIER FLAT CRT DISPLAY APPARATUS PROVIDING SUCCESSIVE COLOR SCANNING LINES FOR EACH SCANNING LINE OF A RECEIVED COLOR VIDEO SIGNAL

BACKGROUND OF THE INVENTION

1. Field of the Invention

This invention relates to colour display apparatus comprising a colour display tube having a channel plate electron multiplier adjacent to a luminescent screen, the screen comprising a repeating pattern of three phosphor elements adapted to luninesce in different colours respectively, means for scanning a single electron beam across an input face of the electron multiplier in a television raster fashion to provide electron input thereto, colour selection electrodes disposed intermediate an output face of the electron multiplier and the luminescent screen which are operable to deflect the electron beam exiting from the channels of the electron multiplier and by appropriate control of which the electron beam can be directed selectively onto each of the plurality of phosphor elements, and circuit means including switching means connected to the colour selection electrodes for driving the display tube in accordance with received standard video signals.

2. Description of the Related Art

An example of such a colour display apparatus is described in published British Patent Application GB 2124017A (PHB 32887) corresponding to U.S. Pat. No. 4,560,898, issued Dec. 24, 1985. The colour selection electrodes used in this apparatus are in the form of a pair of electrodes for each channel of the electron multiplier arranged on opposite sides of the channel axis, or more precisely an aperture in an extractor electrode mounted on, and insulated from, the output face of the electron multiplier aligned with the channel which draws the electrons out of the channel. The pairs of electrodes are electrically insulated from one another and by suitably addressing the electrodes, the electron beam exiting from the aperture in the extractor electrode can be deflected to one side or the other so as to impinge upon respective ones of the plurality of phosphor elements of the repeating pattern to display selectively first and second colours, namely read and blue. In the undeflected state, that is with no potentials or the same potentials applied to the pairs of electrodes, the electron beam is directed onto the third phosphor element of the repeating pattern to produce a green display.

The channels of the electron multiplier, and likewise the aligned apertures of the extractor electrode, are arranged rectilinearly in horizontally spaced columns. The pairs of electrodes comprise strip electrodes with respective ones of the pairs of electrodes associated with adjacent channels being disposed next to one another between the columns and extending the height of the columns. Respective first and second electrodes of all the pairs of electrodes are interconnected electrically.

This display apparatus enables therefore a colour picture to be produced using a single electron beam which is scanned in raster fashion over the input face of the electron multiplier, the required line and field scan deflectors operating on the beam prior to reaching the electron multiplier.

The display apparatus may be used in order to display television pictures according to a conventional standard scanning format, for example the PAL standard of 625 lines, 2:1 interlace, 50 Hz field format where the input red, green and blue signals are derived from an RGB source such as a camera or telecine or from a PAL decoder. There is described in the aforementioned British Patent Application 2124017A and the corresponding U.S. Pat. No. 4,560,898, two modes of operating the display apparatus. In the first of these, the electron beam is scanned over the input face of the electron multiplier at the normal television line scan rate. The current multiplied beam leaves the extractor electrode at the same line scan rate and in the time whilst the beam is being emitted from the channel, the pair of electrodes associated therewith are switched in turn to the voltages necessary to achieve the necessary deflection to direct the beam onto the three, R, G and B, phosphor elements. If picture resolution and quality is not to be degraded this involves switching the voltage applied to the electrodes at a higher frequency than the picture element frequency (typically more than 2 times) whilst the intensity of the beam is switched from the luminance signal of one colour to another of the colours in synchronism with switching of the electrode voltages. Difficulties have been experienced in driving the apparatus in this manner in view of the effects of capacitance between the pairs of colour selection electrodes which causes problems in driving the electrodes with a required waveofrm, even in the case where a comparatively simple sinusoidal waveform is used, since it requires in order to obtain resonance an extremely small tuning inductance which is difficult to achieve in practice and involves a very high circulating current at a preferred cyclic selection frequency. Althrough cyclic selection at a lower frequency could be used to avoid to some extent these problems, this would give rise to a visible and resolution-limiting dot-sample structure in the picture which can also beat with the multiplier and screen structure to cause Moire effects.

In the second mode of operation described in the above-identified patent, a colour picture is obtained by producing successively red, green and blue colour fields in the time of one overall field period, for example 20 ms for a standard 25 frames/second television picture. To do this, the electron beam is scanned over the electron multiplier at three times the usual rate. The beam is modulated in turn for each set of three fields by the red, green and blue information. The voltages applied to the pairs of colour selection electrodes are switched in synchronism with the colour field to be displayed. A disadvantage with this mode of operation is that colour break up is possible with movement in the picture or of the viewer's eye. Moreover, the interlace could be disturbed by stray 50 Hz magnetic fields.

SUMMARY OF THE INVENTION

According to the present invention, there is provided colour display apparatus comprising a colour display tube having a channel plate electron multiplier adjacent to a luminescent screen, the screen comprising a repeating pattern of three phosphor elements adapted to luminesce in different colours respectively, means for scanning a single electron beam across an input face of the electron mulipler in a television raster fashion to provide electron input thereto, colour selection electrodes disposed intermediate an output face of the electron multiplier and the luminescent screen which are operable to deflect the electron beam exiting from the channels of the electron multiplier and by appropriate control of which the electron beam can be directed selectively onto each of the plurality of phosphor elements, and circuit means including switching means connected to the colour selection electrodes for driving the display tube in accordance with received standard video signals, characterised in that the circuit means is arranged to perform the line scan at three times the normal rate with the switching means operating to switch the colour selection electrodes to display in turn separately the three colour components of each standard picture line during the standard line period.

Thus, by drawing three individually coloured lines sequentially for each standard line and applying sequentially respective colour primary signals to the electron beam producing means, (e.g. an electron gun), as each successive line is scanned there is provided in effect a multi-colour line in the standard line scan period.

With such operation, advantage is taken of the limitations of the eye of an observer with regard to acuity and persistence of vision and an acceptable image is obtained. Considering a PAL standard video signal for example, line scan is effected at three times the normal rate, i.e. at 46.875 kHz, and the red, green and blue picture components are displayed individually during the standard 64 μs PAL line period, giving a line scan period for each colour of approximately 21.3 μs. The maximum temporal error for the red, green and blue components of a pixel would then be about 43 μs, which is too small to be perceptible. The operation does not therefore introduce unacceptable picture impairments. A further advantage of this operation is that the frequency of switching of the colour selection electrodes necessary is below the upper limit on the selection rate and/or switching time set by the capacitive nature of the electrodes, and given the required applied operating voltages, the circuit means does not therefore consume unacceptably high switching power.

The circuit means preferably includes a plurality of television line-stores which are read out at three times the write-in rate to derive the required sequential, time-compressed, colour components.

In a particularly simple and convenient embodiment, the circuit means includes two sets of line stores each of which sets is supplied respectively with colour information signals for alternate standard lines, the information signals of one set being read out whilst information signals for the succeeding standard line is being read into the other set. Each set comprises three lines stores, for example dedicated respectively to Y, U and V colour component signals or advantageously to R, G, and B signals directly from a video signal decoder avoiding the need for subsequent matrixing, the contents of the three line stores for a given standard line being read out in turn and supplied to an electron beam producing means of the tube in synchronism with successive color scanning lines of the beam. The supply of signals to and from the line stores, which may be analogue charge coupled delay devices or digital random access memories with associated A/D and D/A convertors, is controlled by electronic switches which operate in synchronism with switching of the colour selection electrodes.

The colour switching sequence of the colour selection electrodes may be continuous such that the line colours displayed are in the sequence 123123123... and so on, or alternatively may be reversing such that the line colours displayed are in the sequence 123321123321 ... and so on. The latter mode has the advantage that switching of the selection electrodes between successive standard lines (each comprising three separate colour lines) is avoided.

In one embodiment of the invention, the circuit means is arranged to operate so as to effect continuous vertical scanning at the standard rate. Given that the received video signals intended for display are according to the normal PAL scanning format this linear vertical scan is carried out, for example, at 50 Hz whilst the line scan is effected at triple PAL rate. In this mode, a line sequential display of red, green and blue components is obtained giving three times the number of standard lines per field, with the pitch between successive red, green and blue components lines being one third that between the standard lines of the field. Considering a standard field of 575 active lines for example, 1725 active color lines are drawn. The maximum spatial error of a primary pixel component will therefore be 4/1725 of the picture height. This mode of operation has the advantages that it is reasonably simple to achieve, and that acceptable resolution is still maintained whilst visible effects on the picture, such as line crawl, should be relatively insignificant.

In another embodiment, the circuit means is arranged to operate so as to perform vertical scan discontinuously with the scan being stepped after scanning each line three times. In this way, the red, green and blue component lines of each original standard PAL line are accurately superimposed on one another with the colour information on each point being presented at the correct place without spatial error and with a temporal error so small as to be practically imperceptible.

BRIEF DESCRIPTION OF THE DRAWINGS

Embodiments of colour display apparatus in accordance with the invention will now be described, by way of example, with reference to the accompanying drawings in which:

FIG. 4 is a schematic circuit diagram of the apparatus using the form of colour display tube shown in FIG. 2.

DESCRIPTION OF THE PREFERRED EMBODIMENTS

Figure 1:
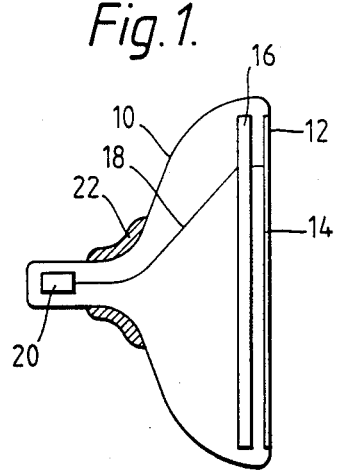
FIG. 1 is a diagrammatic elevation through one form of colour display tube which may be used in the apparatus.

The colour display tube shown in FIG. 1 comprises an envelope 10 with a substantially flat faceplate 12. On the faceplate 12, a phosphor screen 14 is provided comprising repeating groups of red, R, green, G, and blue, B, vertically extending phosphor stripes. A channel plate electron multiplier 16 is arranged parallel to, but spaced from, the screen 14. An electron gun 20 producing a low energy electron beam 18 is disposed in a neck of the envelope 10. The electron beam 18 is scanned in raster fashion across the input face of the electron multipier 16 by deflection means 22 mounted on the tube neck.

Figure 2:
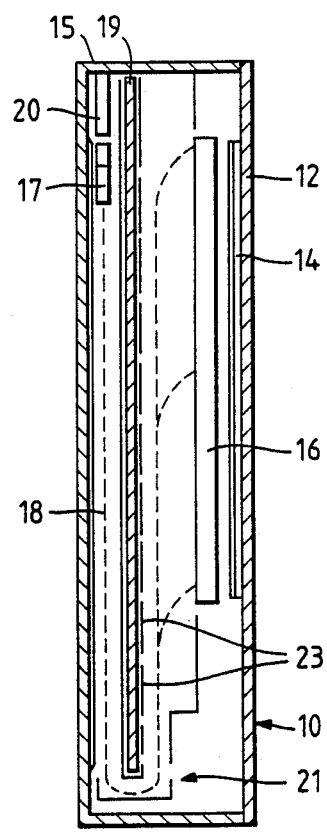
FIG. 2 is a diagrammatic elevation through a second, alternative form of tube which may be used in the apparatus.

With regard to FIG. 2, there is shown a flat colour display tube. Parts thereof generally corresponding with those of the tube of FIG. 1 are designated with the same reference numerals for simplicity. The tube comprises a rectangular envelope 15 having a substantially flat faceplate 12. On the faceplate 12 there is provided a phosphor screen 14 comprising repeating groups of red, R, green, G, and blue, B, vertically extending phosphor stripes. A channel plate electron muliplier 16 is arranged parallel to, and spaced from, the faceplate 12. An electron gun 20 is disposed in the rear portion of the envelope and directs a low-energy electron beam 18 downwardly in a direction parallel to the faceplate 12 and the rear wall of the envelope 15. The beam is deflected by means of an electrostatic deflector 17 positioned near the gun 20 in a plane parallel to the faceplate 12 to effect line scanning. The line scanning beam 18 is deflected through 180° by a reversing lens 21 at the lower end of the envelope so that it travels in the opposite direction over the other side of a partition 19. The partition 19 carries a plurality of selectively energisable, vertically spaced, horizontally elongate electrodes 23. The electrodes 23 are operable to effect field scanning of the electron beam 18 over the input face of the channel plate electron multiplier 16. Having undergone electron multiplication within the multiplier 16, the beam is accelerated on to the phosphor screen 14 by means of an aluminum backing electrode of the screen. Thus, the line scan deflector 17 and field scan electrodes 23 serve the same purpose as the deflection means 22 in the tube of FIG. 1, that is, to scan the single electron beam 18 over the screen 14 in raster fashion via the channel plate electron multiplier 16. The colour display tube of FIG. 2 is similar in many respects to the tube described in published British Patent Application 2101396A. An important difference however is that the tube of the aforementioned application is monochrome, having a single colour phosphor screen, whereas the tube of FIG. 2 is intended for colour display purposes and accordingly is provided in addition with means, as will subsequently be described, for achieving this end.

Figure 3:
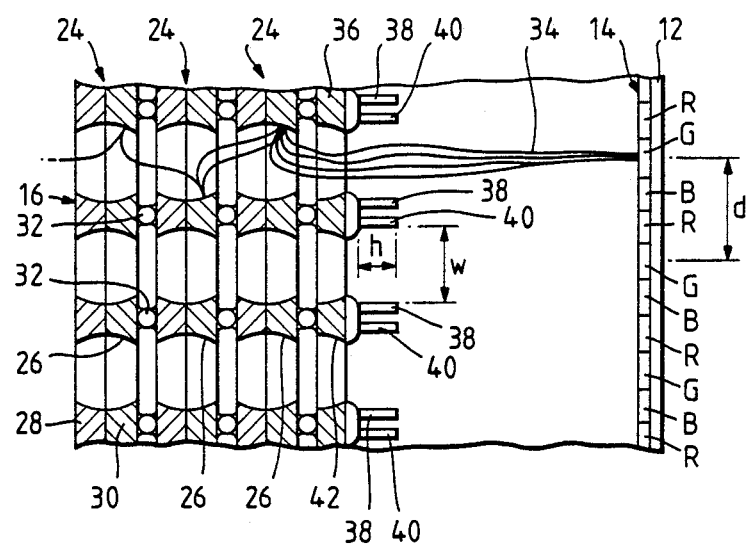
FIG. 3 is a transverse sectional view, not to scale, depicting a portion of the final three stages of a laminated channel plate electron multiplier, the screen and the faceplate used in both forms of the display tubes of the apparatus viewed from above.

The channel plate electron multiplier 16 used in the above-described tubes may be a laminated dynode kind of multiplier. The construction of this kind of multiplier is disclosed in a number of prior British patent specifications of which two examples are Specification 1,434,053 (PHB32324) corresponding to U.S. Pat. No. 4,482,836, issued Nov. 13, 1984, and specification 2,023,332A (PHB3626), details of such U.S. Pat. No. 4,482,826 are incorporated by way of reference. Accordingly a detailed description of its construction and operation will not be given. Briefly however, the electron multiplier 16 comprises a plurality of apertured dynodes 24 of which the last three are shown in FIG. 3. The barrel-shaped apertures 26 in successive dynodes are aligned with each other to form channels. The dynodes 24 in fact comprise two half dynodes 28, 30 arranged back to back. Successive dynodes 24 are separated from each other by a resistive or insulating spacing means which in the illustrated embodiment comprise small glass balls 32 known as ballotini. In operation the electron beam 18 entering a channel undergoes current multiplication by secondary emission as it passes from one dynode to the next, each of which is typically 300 V more positive than the previous one. In order to extract the current multiplied electron beam 34 from the final dynode of the electron multiplier 16, an extractor electrode 36 is provided. This extractor electrode 36 generally comprises a half dynode mounted on, but spaced from, the final dynode. A positive voltage, typically +200 V relative to that of the last dynode, is applied to the extractor electrode 36 which not only draws out the electron beam 34 but also focuses it.

With the illustrated arrangement of the phosphors R, G and B in the repeating groups, an undeflected, current multiplied electron beam 34 will impinge on the green phosphor G. To impinge on the red, R, and blue, B, phosphors the electron beam 34 has to be deflected to the left and to the right, respectively, (i.e. up and down respectively in FIG. 3). In the illustrated embodiment the deflection of the current multiplied electron beam 34 is achieved by colour selection electrodes comprising pairs of electrodes 38, 40 arranged one on each side of each aperture 42 in the extractor electrode 36. The apertures 42 are aligned rectilinearly in columns and the electrodes 38, 40 are elongate, extending the height of the columns. All the electrodes 38 are interconnected as are the electrodes 40. The electrodes 38, 40 are electrically insulated from the extractor electrode 36. These electrodes 38, 40 also have to be fairly deep to be effective, typically for an embodiment having circular apertures 42 the height h should be more than w/2, w being the distance between the electrodes 38, 40 associated with a particular aperture 42, and a typical value for h is 0.5 mm. The deflector electrodes 38, 40 act as part of the lens system which forms an electron beam 34 of the required size. The colour selection electrode arrangement is described in the above-identified greater detail in published British Patent Application 2124017A, corresponding to U.S. Pat. No. 4,560,898 whose disclosure is incorporated herein by reference.

In operation, in order to deflect the electron beam 34 it is necessary to apply a potential difference between the sets of electrodes 38, 40. For example, in a situation where relative to the final dynode the extractor electrode 36 is at, say, +200 V and the screen 14 is at, say, +7 to 10 kV, then for an undeflected beam 34 a mean voltage of +125 V is applied to the electrodes 38, 40 and in this case to obtain a deflection in one direction or the other a potential difference of, say, 60 V is produced so that for a deflection onto the red phosphor, R, the electrode 40 is at +155 V whilst the electrode 38 is at +95 V, the voltage being the opposite way around for deflection onto the blue phosphor B.

The mode of operation of the apparatus to display pictures in accordance with received video signals conforming to a standard format will now be described. The following description concerns the display of video signals according to the standard PAL scanning format by way of example, that is 625 lines, 2:1 interlace, 50 Hz field format where input red, green and blue signals are derived from sources such as a PAL decoder, or a camera or telecine. It will be appreciated that the apparatus may be used with other standard formats instead.

In accodance with the invention, line scan is performed at three times the normal rate, that is, three times the rate determined by the standard PAL scanning format, and the red, green and blue components of each standard PAL line are displayed in turn, separately, in the form of three respectively coloured lines during the normal standard line period, which is 64 μs. In order to do this, the necessary sequential, time-compressed, colour components are derived using a number of television line-stores which store a respective one of the three video colour signals for each PAL line and which are each read-out at three times the write-in rate. The colour deflection voltages applied to the colour selection electrodes, 38 and 40, are cyclicly changed line-sequentially between the three values necessary to deflect the electron beam 34 emerging from the channel plate electron multiplier 16 onto the respective red, green and blue phosphor lines of the screen 14. Either reversing (RGBBGRRGBBG . . . ) or continuous (RGBRGB . . . ) colour sequences may be used. As successive lines are scanned in the different colour selection modes, the appropriate red, green and blue primary video color signals are sequentially supplied to the electron gun 20 in synchronism with the corresponding scanning lines.

To provide these video signals there is a multiple-signal line-store standards-converter. This takes the R, G, B, (or alternatively the Y, U, V) outputs from the composite video signal decoder and loads them into suitable line-stores at the original, standard, single line-scan rate, and then reads them out at three times that rate, in synchronism with the switching of the colour selection electrodes to the appropriate color stripe. This requires that a video output amplifier of three times the normal 5 MHz bandwidth be used. Switching of the colour selection electrodes takes place during the line-blanking interval.

By scanning line-wise at three times the normal rate (i.e. at 46.875 kHz compared with 15.625 kHz PA1 standard) and displaying red, green and blue signals in turn during the 64 µs PAL line period, the maximum temporal error for the red, green and blue components of a pixel would then be about 43 µs which is too small to be perceptible.

FIG. 4 illustrates a suitable circuit of the apparatus for processing of the primary signals required, although processing in terms of U, U and V components followed by matrixing to RGB would also be possible. Referring to FIG. 4, a 46.875 kHz clock pulse generator 50 supplies via one output pulses to a waveform-shape generator 51 which, in turn, feeds a saw-tooth waveform signal having a periodicity of 21.3 µs, as illustrated, to the line deflector 17 which as a result causes line scanning of the electron beam 18 produced by the single electron gun 20, each line lasting a period of 21.3 µs, that is, one third of the standard PAL line rate.

A second output of the clock pulse generator 50 is fed to a divide-by-three circuit 52 having a first output (represented by the adjacent waveform in FIG. 4) at normal PAL line frequency of 15.625 kHz connected to a colour selection electrode switching circuit 54 which switches the potentials applied to the colour selection electrodes 38 and 40 three times, at equal intervals, to three different values during the normal PAL line period (64 µs) in synchronism with line scanning so that for each successive group of three scanned lines, the three colours respectively may be displayed. The sequence of switching performed by the circuit 54 may be continuous, as shown, giving RGBRGB . . . (and so on) colour lines or alternatively may be reversing, not shown, giving RGBBGRRGBBG . . . (and so on).

The first output of circuit 52 is fed also to an electronic switch circuit 56 comprising banked, three position, switches 56' and 56".

A second output of circuit 52 is connected, firstly, to a divide-by-two circuit 58 whose two level output represented by the adjacent waveform is fed to a changeover electronic switch 60 whose output is connected to the electron gun 20 via a video output amplifier 61, and, secondly, to three, ganged, colour signal electronic change-over switches 62', 62" and 62'''.

RGB colour components signals from, for example, a PAL decoder, are supplied to respective inputs of the switches 62', 62" and 62'''. The input signals to each of these switches contains information regarding the associated colour in successive 64 µs blocks, each block corresponding to a single, standard, line scan. The RGB input signals are fed simultaneously to respective line stores 64, 65 and 66, there being two associated line stores 64' and 64", 65' and 65", and 66' and 66" for each of the RGB signals for reasons which will become apparent. The line stores may be of the charge coupled delay type in which analogue samples of the appropriate signals are stored and moved in shift register manner, or, alternatively, may be of the digital random access memory (RAM) type (with A/D and D/A convertors at their inputs and outputs respectively), in which the signal samples are stored in digital form. Both types have serial output. With the position of the switches 62' 62" and 62''' as shown in FIG. 4, the colour components signals for a line are written into their respective line stores 64', 65' and 66' at the rate received, so that each line store holds colour information of one color during a 64 µs period, i.e. a standard line scan. Following each complete standard line scan period, the colour information in each line store 64', 65" and 66' is read out in 21.3 µs, in turn that is, three times as fast. At the end of the 64 µs write-in period for these line stores, the electronic switch 60 is switched by the circuit 58 from the state shown in FIG. 4 to its other state, shown in dotted form, for a corresponding period of 64 µs. Immediately upon doing so, the time-compressed red colour information for a standard line scan period stored in line store 64' is read out and supplied to the electron gun 20 via the switches 56 and 60 and the video amplifier 61 in synchronism with a first 21.3 µs period line scan of the electron beam 18 produced by the deflector 17 to draw a red picture component line on the screeen 14. After completion of read-out, that is, 21.3 µs later, the switch 56' and (56") is switched under the control of circuit 52 from its first position as shown to its second position and the green colour information contained in line store 65' is fed via switches 56' and 60 and video amplifier 61 to the electron gun 20, again in synchronism with operation of the deflector 17, so that the next line drawn on the screen 14 contains the green colour picture component. The switch 56' then switches to its third position in which the blue colour information is read out from line store 66' and supplied to the electron gun 20 during the succeeding line scan to draw a blue picture component line. Thus, in a single standard line scan period, three temporally separate lines are drawn sequentially on the screen 14, each displaying information in a respective primary colour for a standard line.

At the instant the switch 60 switches in response to the output from the circuit 58 from its position to the position shown dotted in FIG. 3, the switches 62', 62" and 62''' simultaneously switch to their second positions to supply the RGB colour components signals for the succeeding scanning line to the line-stores 64", 65" and 66" respectively so that the colour component information of the succeeding PAL line is written into these line stores whilst the colour information of the preceding PAL line is being read out from the line stores 64', 65' and 66'. At the termination of the 64 µs standard PAL line period, when the succeeding line colour information is stored in line stores 64", 65" and 66" and the contents of the line stores 64', 65' and 66' have been read out, the switch 60 is switched back to its original position as shown in FIG. 4 under the control of circuit 58 and the information contained in line stores 64″, 65″ and 66″ fed out in turn in a similar manner via the switches 56″ and 60 and amplifier 61 to the electron gun 20 in synchronism with the waveform applied to deflector 17 such that three separate lines containing respectively RGB colour information are drawn on the screen 14. The switches 62 are again switched at the same time as switch 60 so that whilst line stores 64″, 65″ and 66″ are being read out the RGB components of the next PAL line are written into the line stores 64′, 65′ and 66′ and the sequence of operation described above is repeated. The manner in which the switches 56′ and 56″ switch between their three states depends on the chosen mode of switching electrode sequence mode, i.e. continuous or reversing.

Thus for each standard PAL line, three separate lines are drawn on the screen in turn at three times the rate of the PAL lines, each line being in a respective colour as determined by switching of the colour selection electrodes 38 and 40 by the switching circuit 54 and lasting one third of the period of the standard PAL line.

Vertical, field, scanning of the electrical beam is accomplished by applying appropriate voltages selectively to the plurality of electrodes 23 to control the point at which the electron beam is deflected from its path parallel to the faceplate 12 towards the electron multiplier 16 and the screen 14.

The field scanning of the display may be accomplished by carrying out "linear" vertical scan at, in accordance with PAL standard, 50 Hz continuously whilst performing the line scan at the triple-PAL rate in the aforementioned manner. In this case, the primary colour information is drawn in slightly spaced respective colour lines with a pitch between successive red, green and blue component lines (for the case of a continuous RGBRGB ... colour sequence) being one third that of the standard lines of a field. The maximum spatial error of a primary pixel component will therefore be 4/1725 of the picture height, bearing in mind that there are actually 575 active lines in each primary colour in a standard 625 line display, giving a form of 1725 line display. The switching of the electrodes 23 to achieve this continuous, linear field scan is controlled by a switching circuit 68 supplied with a synchronised sawtooth waveform signal having a frequency of 50 Hz.

An alternative way of accomplishing vertical, field scanning is to step the vertical scan after every three triple-PAL rate scanning lines, that is, after each block of three separate and differently coloured lines corresponding to a single PAL standard line, so that the red, green and blue components of each standard PAL line are accurately superimposed and the maximum spatial error is, in principle, zero. To achieve this discontinuous, stepped, triple line sequential operation, the electrode switching circuit 68 applies synchronised staircase voltage waveforms to the electrodes 23, for example using the output of circuit 58, whereby after every group of three lines drawn corresponding to a single PAL line, i.e. every 64 μs, the electrodes 23 are appropriately energised to step the beam downwardly over the input face of the multiplier by an amount corresponding to the spacing of a standard line. In this way a conventional three gun display is emulated with 575 active lines and without any colour registration errors.

I claim:

1. Color display apparatus for received video signals representing three primary colors of successive picture elements on each of successive scanning lines of an image occurring at a scanning line frequency H, such apparatus including an electron multiplier color display tube which comprises: a display screen having thereon successive triads of phosphor stripes respectively electroluminescent in the respective primary colors; an electron gun producing a single electron beam which causes said stripes to luminesce when incident thereon; line-scanning means for deflecting said beam across the successive triads of color stripes; and a succession of color selection electrodes for selectively diverting said beam to respective color stripes in each of such triads; such apparatus being characterized in that it further includes a color selection circuit comprising:

clock pulse generating means for controlling said line scanning means to deflect the electron beam at a line scanning frequency of substantially 3 H;

first switching means for applying voltages to said color selection electrodes which are cyclically changed so as to cause said electrodes to divert said beam to successive color stripes in each of said triads at a frequency of substantially 3 H; and second switching means for receiving the three primary color video signals for each image scanning line and sequentially applying them to said electron gun during each such scanning line;

whereby three primary color scanning lines are successively produced on said display screen corresponding to each of the image scanning lines of the received video signals.

2. Color display apparatus in accordance with claim 1, wherein said second switching means comprises a plurality of stores respectively storing therein the respective color video signals of each image scanning line as such signals are received, said stores successively reading-out the video signals stored therein to said electron gun at three times the rate at which such signals were stored therein; whereby the electron gun is successively switched between the three respective color video signals at each image scanning line during the period of each such scanning line.

3. Color display apparatus as claimed in claim 2, wherein said second switching means comprises two sets of stores, such sets respectively storing the color video signals of alternate image scanning lines as such signals are received, and one of said sets reading out the image scanning line video signals stored therein to said electron gun while the video signals of the succeeding image scanning line are being received and stored in the other of said sets.

4. Color display apparatus as claimed in claim 3, wherein each of said sets comprises respective stores storing therein the respective received color video signals of an image scanning line, the stores in each set reading out the video signals stored therein in turn to said electron gun in synchronism with line-scanning by said electron beam.

5. Color display apparatus as claimed in claim 3 or claim 4, wherein said second switching means comprises electronic switches which supply the respective color video signals to the respective stores and read-out of the signals stored therein to said electron gun, such read-out being synchronized with the diversion of said beam to successive ones of the color stripes in each of said triads by said first switching means.

6. Color display apparatus as claimed in claim 4, wherein the received video signals represent Red, Green and Blue primary colors of picture elements of an image in each of successive image scanning lines, and the stores in each of said sets respectively store the Red, Green and Blue primary color video signals of an image scanning line.

7. Color display apparatus as claimed in accordance with any of claims 1, 2, 3 or 4, wherein said first switching means applies voltages to the color selection electrodes which cyclically divert the electron beam in the same direction across said traids of color stripes during each of the image scanning lines, whereby the displayed color sequence during successive image scanning lines in a continuous sequence of colors 1,2,3, . . . 1,2,3 . . . 1,2,3.

8. Color display apparatus in accordance with any of claims 1, 2, 3 or 4, wherein said first switching means applies voltages to the color selection electrodes which cyclically divert the electron beam in mutually opposite directions across said triads of color stripes during alternate image scanning lines, whereby the displayed color sequence during successive image scanning lines is a reversing sequence of colors 1,2,3, . . . 3,2,1, . . . 1,2,3.

9. Color display apparatus in accordance with any of claims 1, 2, 3 or 4, further comprising field-scanning means for deflecting the electron beam in a direction parallel to said color stripes following completion of each of said color scanning lines.

10. Color display apparatus in accordance with any of claims 1, 2, 3 or 4, further comprising field-scanning means for deflecting the electron beam in a direction parallel to said color stripes only after each completion of all of the color scanning lines corresponding to an image scanning line.

* * * * *